H. F. RICHARDSON.
CONNECTION BOX AND PLUGGING JACK.
APPLICATION FILED SEPT. 11, 1914.
1,223,111.
Patented Apr. 17, 1917.
3 SHEETS—SHEET 1.
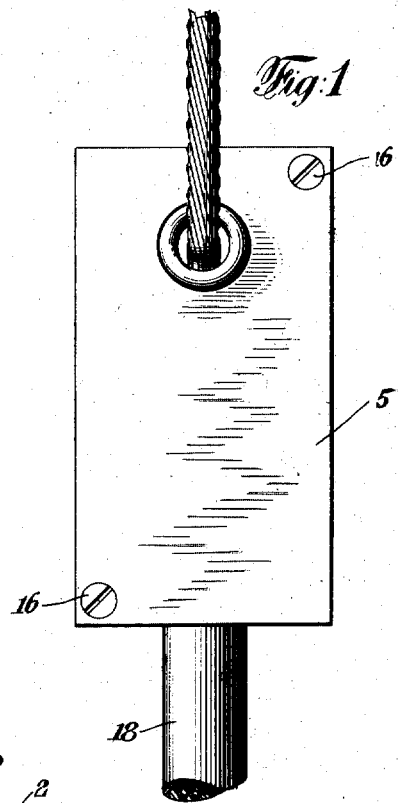
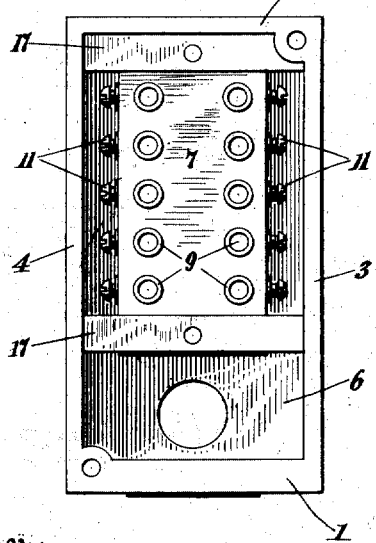
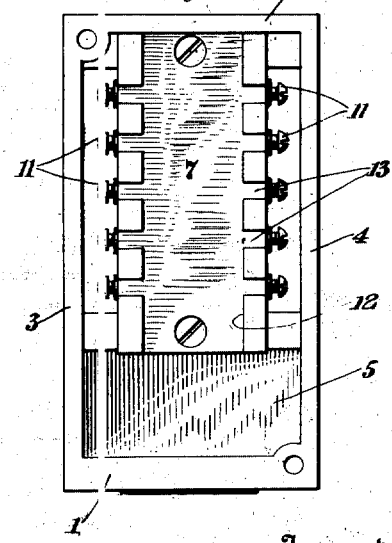
Witnesses:
L. Broderick
M. Morse
Inventor
Henry F. Richardson,
By his Attorneys
Pindle & Wright.

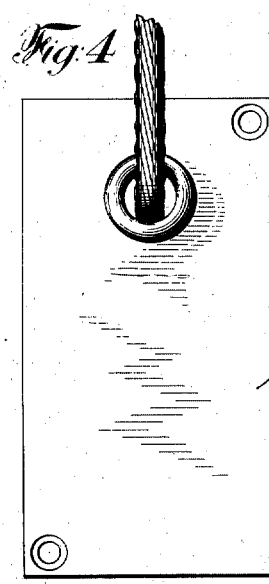
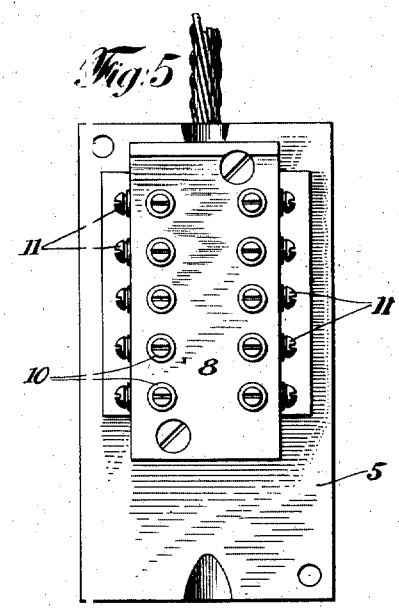
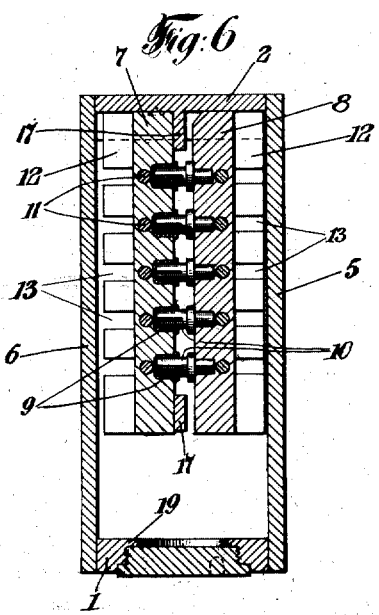
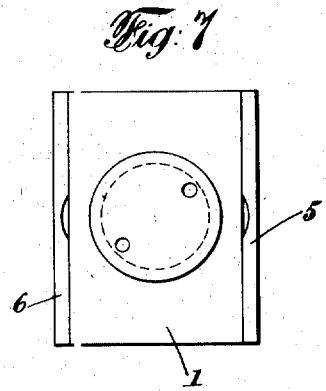

H. F. RICHARDSON.
CONNECTION BOX AND PLUGGING JACK.
APPLICATION FILED SEPT. 11, 1914.
1,223,111.
Patented Apr. 17, 1917.
3 SHEETS—SHEET 3.
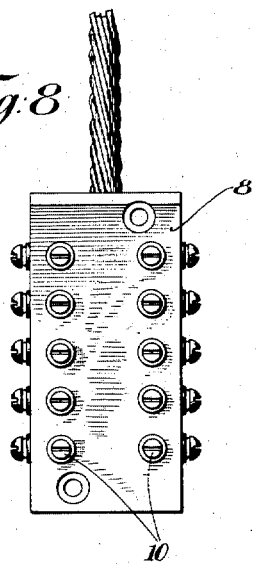
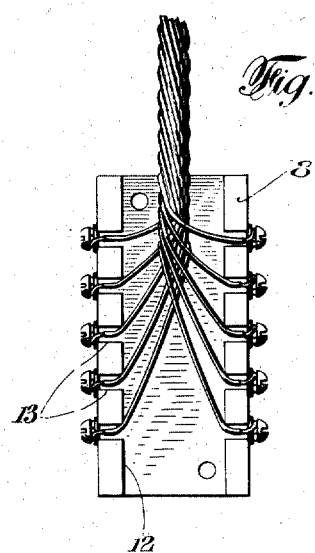
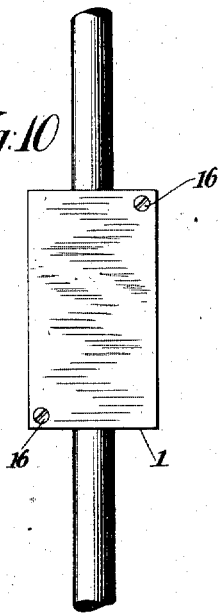
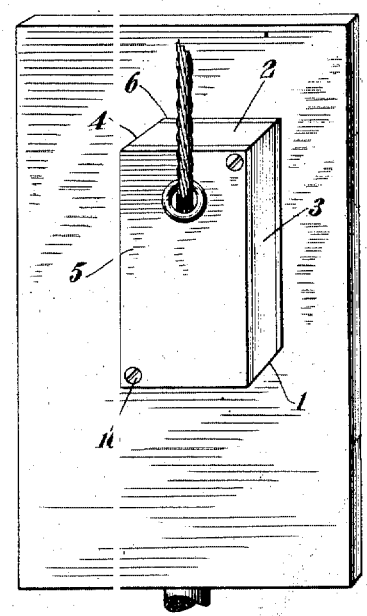
Witnesses:
L. Broderick
M. Morse
Inventor
Henry F. Richardson
By his Attorneys
Prindle & Bright

UNITED STATES PATENT OFFICE.

HENRY FERGUSON RICHARDSON, OF NEW YORK, N. Y., ASSIGNOR, BY DIRECT AND MESNE ASSIGNMENTS, TO SAID HENRY FERGUSON RICHARDSON AND CHARLES AUTH, TRUSTEES, OF HOBOKEN, NEW YORK.

CONNECTION-BOX AND PLUGGING-JACK.

1,223,111.   Specification of Letters Patent.   Patented Apr. 17, 1917.

Application filed September 11, 1914. Serial No. 861,178.

*To all whom it may concern:*

Be it known that I, HENRY FERGUSON RICHARDSON, of New York, in the county of New York, and in the State of New York, have invented a certain new and useful Improvement in Connection-Boxes and Plugging-Jacks, and do hereby declare that the following is a full, clear, and exact description thereof.

The object of my invention has been to provide a connection box and plugging jack having, among others, the following advantages:

That it shall be capable of use in a variety of positions; that it shall be cheap to install and connect, and that it shall be practically safe from short circuiting and grounding, even when installed by comparatively careless labor, and to such ends my invention consists in the connection box and plugging jack hereinafter specified.

In the accompanying drawings—

Figure 1 is a side elevation of an embodiment of my invention when mounted upon a conduit beneath a desk and connected with apparatus upon the desk;

Figs. 2 and 3 are, respectively, front and back elevations of the box, the front cover and its attached contact block being removed;

Figs. 4 and 5 are similar views of the front cover with its attached contact block;

Fig. 6 is a vertical sectional view of Fig. 1 taken through the conduit;

Fig. 7 is an end elevation of the box showing the conduit opening closed by a screw plug;

Figs. 8 and 9 are, respectively, front and back views of the contact blocks with the wires attached;

Fig. 10 is a view of the box of Fig. 1 used upon a wall between sections of a conduit; and Fig. 11 is a view showing my connection box and plugging jack mounted on a baseboard.

While, in the accompanying drawings, I have illustrated the best form of my invention known to me, such form is to be regarded as typical only of many possible embodiments and my invention is not to be restricted thereto.

My invention relates to devices for making a separable connection between wires fixed in or to a floor or wall of a building, and push buttons, telephone systems and other apparatus mounted upon a desk. It being desirable to have the desk movable, it is necessary that the connection between the wires on the desk and those fixed upon the building be readily detachable. My invention is particularly designed for such a connection, in which there are a considerable number of wires running to the desk.

In the illustrated embodiment, the principal parts are the four sides of a box 1, 2, 3 and 4, front and back covers 5 and 6, respectively, and connection blocks 7 and 8, respectively, which blocks are formed of non-conducting material, and upon which blocks are mounted, the plugs, sockets or other forms of connecting devices, one for each wire to be connected. One of said blocks is mounted upon the front cover 5 of the box, and the other within the box frame itself, so that the removal of the cover from the box will carry with it its connection block and the wires attached thereto.

I will first describe in detail the form of the connection blocks and then the manner of mounting them in the box.

In the form illustrated, each block has two rows of connecting devices mounted therein upon the face of the block, the connecting devices on the block 7, in the present instance, being in the form of sockets 9 which are adapted to receive split plugs 10 mounted in the face of the opposing block 8. Each plug and each socket has a terminal screw 11 passing through the side of the block and entering its particular plug or socket, the screw having a washer beneath its head and serving the double purpose of fastening the plug or socket in place, and also of serving as a terminal to which to connect the wire to be in circuit. The wire may be clamped between the head of the screw and the washer.

The multiple wires, in the form of a cable, for instance, are received in a channel 12 formed in the back of each block, and a slot 13 is formed in the side walls of the channel opposite each terminal screw. Each channel is preferably covered by some non-conducting material. In the present instance I have shown for this purpose a plate 15 of non-conducting material, by means of which the wires are protected from being touched by anything metallic.

The block 8, as before stated, is secured to the front cover and this is done, in the present instance, by means of screws. The block 7 is, in the present instance, illustrated as secured by screws to bridge pieces 17 formed in the box. The covers may be fastened to the box frame in any desired manner, as by screws.

The blocks 7 and 8 preferably do not extend the entire length of the box but leave a space between themselves and the box end 1, and an opening is formed in said end for the admission of the cable of wires. In the present instance that opening is shown as circular and threaded to fit the conduit 18, and a lip 19 is formed at the inner end of the opening to project over the end of the conduit and protect the wires from coming in contact with any fins or ragged edges there may be on the end of the conduit. Each cover is also provided with a bushed opening through which cables may enter.

In the use of my invention on the end of a conduit rising through the floor, as shown in Fig. 1, the box is supported upon the conduit and the cable of wires rising through the conduit passes into the channel at the back of the block 7, where each wire is separated from the others, and lead through its channel 13 to its proper terminal screw 11, the insulation on the wire being removed only sufficiently to bare the wire to the clamping action of the screw. Similarly the cable leading to the electric devices on the desk passes through the bushed opening in the front cover and its wires are likewise secured to the terminal screws.

It will be seen that, there being no occasion to remove insulation from the wires in the channels or even in the slots passing through the side walls of the channels, and the said slots being adequately separated from each other, and the terminal screws being on the outside of the block and not in the channel, my invention provides most substantial protection against grounding or short-circuiting due to the accidental coming together of the wires of the cable. This protection is so effective and certain that a comparatively low grade of labor can successfully make safe connections of wires. The split plugs and sockets I find, by experience, to make effective and reliable connections for every wire involved.

My box is exceedingly compact having only the thickness of the two blocks and the two box covers.

As shown in Fig. 10 my box may be mounted upon the wall interposed in a conduit, the lowest section of which enters the lowest end of the box, and the upper section of which enters the upper end of the box.

My box may be used in many different positions. For instance, as shown in Fig. 11, it may be mounted upon a base-board and the wires may enter it from the back, through the base-board.

The holes adapted to receive pipes or conduits may be provided with screw plugs so that they can be filled when not being used for connection with a pipe or conduit. In Fig. 7 I have illustrated such a plug screwed into its hole.

I claim—

1. In a device of the character described, the combination of a block having a plurality of connection devices, a channel having slots through its side walls, and terminals for said connection devices to which said slots lead.

2. In a device of the character described, the combination of a block having a plurality of connection devices, a terminal for each of said connection devices, a common entrance for wires and a separate slot leading from the common entrance to said connection devices.

3. In a device of the character described, the combination of a block having a plurality of connection devices set in a face, a plurality of terminals set in a side and passing through and securing said connection devices in place, a common entrance for wires, and a separate slot leading from the common entrance to each of said terminals.

4. In a device of the character described, the combination of a block having a plurality of rows of connection devices on its face and corresponding terminals upon the opposite sides of the block, the block having a channel in the back thereof, and slots through the side walls of the channel adjacent said terminals.

5. In a device of the character described, the combination of a pair of blocks, one of said blocks having a plurality of plugs thereon, and the other of said blocks having corresponding sockets and a plurality of terminal posts connected thereto, and having separate passages for the wires leading to the same, said terminal posts being located at an angle to the plugs and sockets.

6. In a device of the character described, the combination of two blocks, one of said blocks having a plurality of rows of plugs thereon, and the other of said blocks having corresponding rows of sockets therefor and means for leading in the main connecting wires to the plugs and sockets at an angle to the latter.

7. In a device of the character described, the combination of an open frame consisting of sides and ends, means for supporting a block therein, connection devices on said block, terminals therefor on the side of the block, a cover and a block under said cover having corresponding connection devices.

8. In a device of the character described, the combination of an open frame having opposite covers, a block supported therein near one of said covers, said block having a channel on its cover-side, a corresponding block near the opposite cover, said blocks having co-acting connection devices thereon.

9. In a device of the character described, the combination of an open frame having opposite covers, a block supported therein near one of said covers, said block having a channel in its cover-side, a corresponding block near the opposite cover, said blocks having co-acting connection devices thereon, there being a space between said blocks and one end of said frame, one of said box parts having a hole therein opening into said space.

10. In a device of the character described, the combination of an open frame having opposite covers, a block supported therein near one of said covers, said block having a channel on its cover-side, a corresponding block near the opposite cover, said blocks having co-acting connection devices thereon, there being a space between said blocks and one end of said frame, said end of said frame having an opening therein, and a plug adapted to close said opening.

11. In a device of the character described, the combination of a block having a plurality of connection devices, a channel having slots through its side walls, terminals for said connection devices to which said slots lead, and an insulating closure.

12. In a device of the character described, the combination of an open frame, covers therefor, blocks having corresponding connection devices mounted in their adjacent faces, one of said blocks being mounted in said frame, said blocks having channels in their rear sides, and slots formed in the walls of said channels to reach said connection devices.

13. In a device of the character described, the combination of an open frame, covers therefor, corresponding blocks, one mounted in said frame, said blocks having connection devices on their adjacent faces, and having terminals therefor upon their sides, said blocks having channels in their rear sides and slots opening from said channel toward said terminals.

14. In a device of the character described, the combination of an open frame, covers therefor, corresponding blocks, one mounted in said frame, said blocks having connection devices on their adjacent faces, and having terminals therefor upon their sides, said blocks having channels in their rear sides and slots opening from said channel toward said terminals, said connection devices being in the form of rows of split plugs and corresponding rows of sockets therefor, and said terminals being in the form of screws passing through the shanks of said plugs and sockets.

15. In a device of the character described, the combination of an open frame, covers therefor, a pair of blocks, one of which is fastened to said frame, said blocks carrying co-acting connection devices, said last mentioned cover having an opening therethrough, and its block having a channel in the back with slots leading to said connection devices but through its walls.

16. In a device of the character described, the combination of a block having a plurality of connection devices, a recess having passages through its side wall, and terminals for said connection devices, to which said passages lead.

17. In a device of the character described, the combination of a frame, a cover therefor, blocks having corresponding connection devices mounted in their adjacent faces, one of said blocks being mounted in said frame, said blocks having channels in their rear sides and slots formed in the walls of said channels to reach said connection devices.

In testimony that I claim the foregoing I have hereunto set my hand.

HENRY FERGUSON RICHARDSON.

Witnesses:
   EDWIN J. PRINDLE,
   L. BRODERICK.